US 6,527,141 B2

(12) United States Patent
Sanders

(10) Patent No.: US 6,527,141 B2
(45) Date of Patent: Mar. 4, 2003

(54) DISPENSING MEASURED QUANTITIES OF MATERIALS FOR MIXING INTO A LARGER BATCH

(76) Inventor: Odiel Sanders, Box 39, Altamont, Manitoba (CA), R0G 0A0

( * ) Notice: Subject to any disclaimer, the term of this patent is extended or adjusted under 35 U.S.C. 154(b) by 0 days.

(21) Appl. No.: 09/990,577

(22) Filed: Nov. 23, 2001

(65) Prior Publication Data

US 2002/0066746 A1 Jun. 6, 2002

(30) Foreign Application Priority Data

Dec. 5, 2000 (CA) .............................................. 2327599

(51) Int. Cl.⁷ ................................................. G01F 11/00
(52) U.S. Cl. .............................. 222/1; 222/56; 222/77; 222/152; 222/368; 209/148
(58) Field of Search ............................... 222/1, 56, 77, 222/152, 195, 367, 368; 209/722, 146, 148

(56) References Cited

U.S. PATENT DOCUMENTS

| | | | | |
|---|---|---|---|---|
| 4,180,185 A | * | 12/1979 | Yamamoto et al. ............ | 222/57 |
| 4,345,858 A | * | 8/1982 | Barlow ........................ | 222/77 |
| 4,477,339 A | * | 10/1984 | Whaley et al. .............. | 209/144 |
| 4,526,678 A | * | 7/1985 | Myhren et al. .............. | 209/148 |
| 4,762,252 A | * | 8/1988 | Hyer et al. ..................... | 222/56 |
| 5,106,488 A | * | 4/1992 | Jonasson ..................... | 209/144 |
| 5,109,893 A | * | 5/1992 | Derby ......................... | 222/368 |
| 5,435,189 A | * | 7/1995 | Gmuer et al. ................. | 222/77 |
| 5,657,902 A | * | 8/1997 | Kraus ........................... | 222/56 |

* cited by examiner

Primary Examiner—Joseph A. Kaufman
(74) Attorney, Agent, or Firm—Adrian D. Battison; Michael R. Williams; Ryan W. Dupuis

(57) ABSTRACT

An apparatus for dispensing measured quantities of particulate material includes a tubular duct arranged so that an air stream in the duct carries material along the duct and a row of hoppers each for containing the material to be dispensed; the hoppers being connected to the duct so that material can be dispensed from the hopper to the duct. A separator container is provided in the duct such that the material in the duct carried by the air flow passes to the separator container. A centrifugal separator section is provided in the container for separating the material from the air flow to deposit the material into the container while the air flow is discharged from the container. The container is mounted on legs with load cells for weighing the deposited material while the material is maintained in the separator container and the air lock valve are controlled so as to continue to discharge the material up to a predetermined weight and to halt the discharge when the predetermined weight is reached.

18 Claims, 1 Drawing Sheet

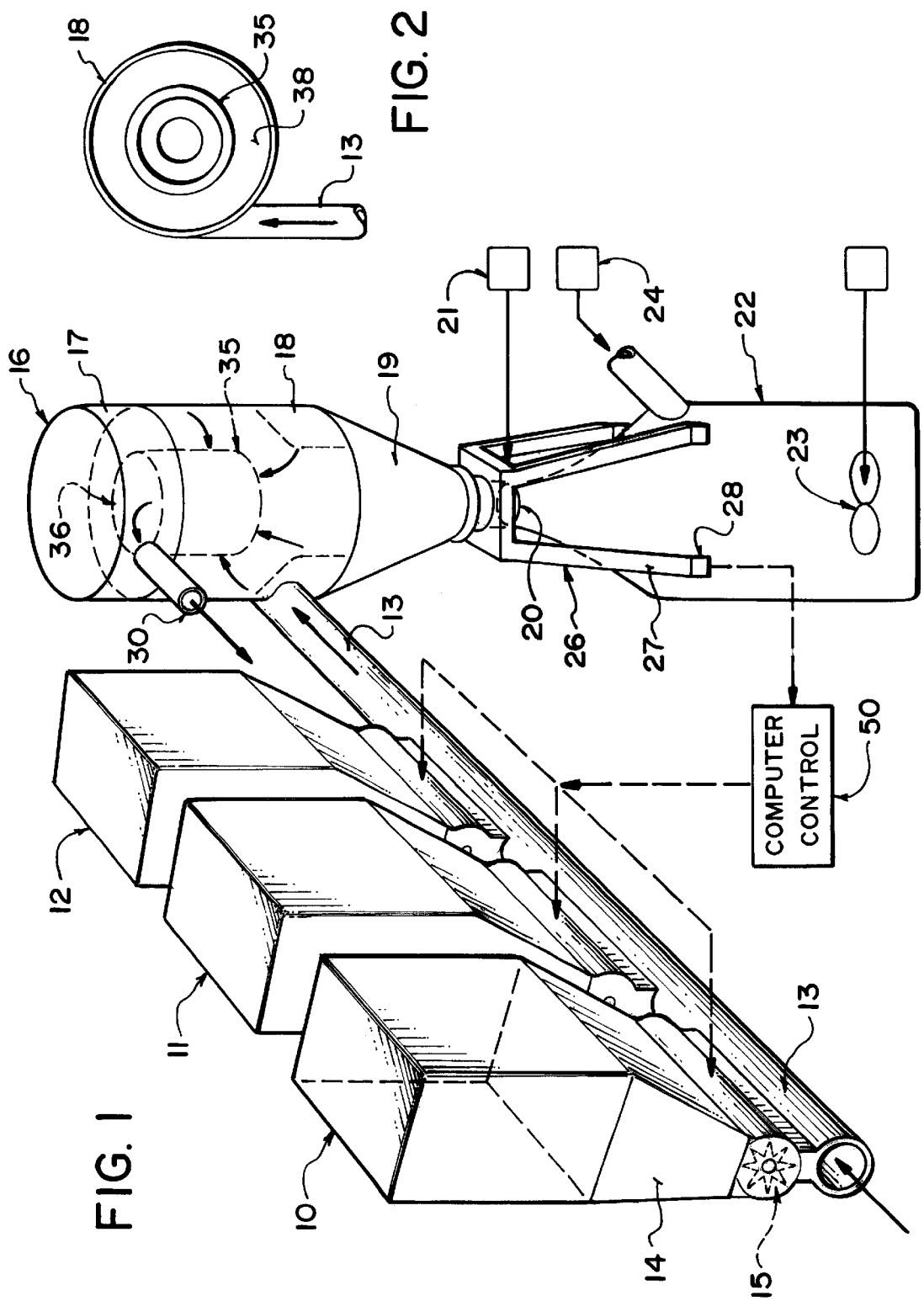

DISPENSING MEASURED QUANTITIES OF MATERIALS FOR MIXING INTO A LARGER BATCH

This invention relates to a method for dispensing measured quantities of materials for mixing into a larger batch which is particularly but not exclusively designed for dispensing micro-nutrients in powder or particulate form into a batch of feed for animals.

BACKGROUND OF THE INVENTION

It is often desired to mix into bulk materials smaller components to complete a recipe required for the finished product. Thus for example in feed products for animals such as pigs, poultry and the like, the bulk materials can comprise grain or other feed products but it is often required to add to the bulk feed micro nutrients so as to provide a required mix of the materials for feeding to the animals. Thus for example in a ton of the mixed feed, there may be up to eight or even up to sixteen or in some cases even up to fifty different micro nutrients which might be supplied in small amounts such 0.5 up to 5.0 kilograms. The micro nutrients when measured are dispensed into the mixing chamber with the bulk materials for mixing.

Up till now there has not been any effective system for computer controlled management of the micro nutrient ingredients so that these materials can be properly weighed and dispensed into the mixing without the necessity for manual intervention.

SUMMARY OF THE INVENTION

It is one object of the present invention therefore to provide an improved method and apparatus for measuring and dispensing materials. The method can be used for example in mixing food stuffs but this is only one example of suitable end uses.

According to one aspect of the invention there is provided a method for dispensing measured quantities of particulate material comprising:

providing a duct;

providing at least one hopper containing the material to be dispensed;

connecting the hopper to the duct so that material can be dispensed from the hopper to the duct;

generating an air flow through the duct to carry the material from the hopper along the duct;

controlling flow of material from the hopper to the duct through an air lock valve which prevents flow of air from the duct to the hopper;

providing a separator container in the duct such that the material in the duct carried by the air flow passes to the separator container;

in the separator container separating the material from the air flow to deposit the material into the container while the air flow is discharged from the container;

weighing the deposited material while the material is maintained in the separator container and controlling the air lock valve so as to continue to discharge the material up to a predetermined weight and to halt the discharge when the predetermined weight is reached;

and discharging the deposited material from the separator container.

Preferably the separator container is mounted on a weighing system to effect weighing thereof with the material inside.

Preferably the container is mounted on load cells.

Preferably there is a plurality of hoppers each for a different material and each is connected to the duct for discharge through an air lock valve for sending material to the separator container.

Preferably in a batch of materials, all of the materials are sent to the container before the materials are discharged.

Preferably materials from the container are discharged into a mixing container.

Preferably the mixing container includes bulk materials into which the materials from the hoppers are mixed.

Preferably the separator container includes a centrifugal separating section.

Preferably the duct injects the mixed air flow and materials tangentially into the centrifugal separator.

Preferably the centrifugal separator includes a central filter section through which the air is withdrawn.

Preferably the air is pulled by vacuum from the separator.

Preferably the separator container is mounted on legs each of which includes a load cell.

Preferably hoppers are arranged in a row along the duct and are computer controlled in response to an input of the predetermined weight of each material required and the measured weight in the container.

Preferably the materials are micro-nutrients for mixing into bulk feeds for feeding to animals.

According to a second aspect of the invention there is provided an apparatus for dispensing measured quantities of particulate material comprising a duct; at least one hopper for containing the material to be dispensed; the hopper being connected to the duct so that material can be dispensed from the hopper to the duct; means for generating an air flow through the duct to carry the material from the hopper along the duct; a separator container in the duct such that the material in the duct carried by the air flow passes to the separator container; means in the separator container for separating the material from the air flow to deposit the material into the container while the air flow is discharged from the container; and means for weighing the deposited material while the material is maintained in the separator container and controlling the air lock valve so as to continue to discharge the material up to a predetermined weight and to halt the discharge when the predetermined weight is reached.

BRIEF DESCRIPTION OF THE DRAWINGS

One embodiment of the invention will now be described in conjunction with the accompanying drawings in which:

FIG. 1 is a schematic illustration of the measuring system according to the present invention including mixing unit into which the measured materials are dispensed.

FIG. 2 is an cross-section through the separating container.

DETAILED DESCRIPTION OF PREFERRED EMBODIMENTS

In FIG. 1 is shown a plurality of micro nutrient hoppers 10, 11, 12 etc in a row arranged along a feed duct 13. Each hopper contains a respective one of the micro nutrients to be added to a bulk mixed product. Each hopper includes a conical lower section 14 leading to a rotary airlock valve 15 which separates the hopper from the feed duct 13.

Rotary air locks of this type are well known and provide tip seals rotating within a cylinder so that the micronutrients are contained between the arms of the airlock and thus rotate to a discharge position where they can be discharged into the duct without the possibility of airflow between the hopper and the duct. Many different styles of rotary air lock are available and these can be commercially purchased from suitable suppliers.

The duct is simply a hollow tube through which air passes so that material discharged into the duct from the hopper is discharged into the airflow and carried by the airflow along the duct.

The duct communicates with a separator container 16 in the form of a cylindrical tower including an upper chamber 17, a separation chamber 18 and a conical discharge section 19. At the bottom of the conical discharge section 19 is provided a valve 20 which can be opened by a control 21 so as to allow discharge of materials collected in the hopper section 19 from the bottom into a mixing chamber 22 shown only schematically. The mixing chamber 22 includes a mixing agitator 23 for mixing bulk materials from a supply schematically indicated at 24. It will of course be appreciated that the drawing is not to scale so that the mixing chamber will indeed be large to receive an amount of material much greater than the quantities of the micronutrients to be added to the mixed product. The separator container 16 is mounted on a suitable platform and support structure 26 which includes legs 27 each having a load cell 28 at some point in the leg which acts to effect a continual weighing of the total of the separator container and any materials therein. Load cells of this type are well known for weighing objects of this type and can provide accuracy of the order of 10 to 50 grams within a weight of material in the container of the order of 0.5 up to 5 kilograms.

The container 16 is dimensioned so that it can receive preferably all of the micro nutrients that will be required for a batch of the mixed material. However in some cases it may be necessary to discharge the materials from the container more than once during a mixing if particular micro nutrients are to be supplied in larger quantities.

The upper chamber 16 has a vacuum duct 30 attached from which air is withdrawn pulling air into the separation section 18. A central hole in the upper chamber at the base of the upper chamber communicates with a central area of the separation section 18. A filter screen 35 of cylindrical shape projects downwardly from the central hole 36 into the separation section so as to be coaxial with the outer wall of the separation section and define a cylindrical chamber 38 within which the separation occurs due to centrifugal action. The duct 13 as shown in FIG. 2 connects generally tangentially with the cylindrical wall of the separation section so as to inject the air flow and mixed materials tangentially to flow around the cylindrical wall with the air tending to move inwardly and pass through the filtration screen 35 into the central circular area for discharge into the upper chamber. The heavier particles swirl around the outer wall and slow down so that they fall downwardly into the hopper section 19 for collection at the bottom of the hopper section.

Weighing of the materials in the container continues during this separation action so that any materials connecting on the filtration screen 35 are also attached to the container and therefore included in the weight of material within the container. The materials dropping to the bottom of the container sit on the hopper section 19 and thus contribute to the weight of the container. The difference between the original weight of the container and the instantaneous current value of the weight as detected by the load cells 28 and communicated to a computer control 50 is equal to the weight of material which has been transported from the particular hopper to the container. When the weight of materials reaches the predetermined required amount of material for the particular recipe required, the computer control system halts actuation of the rotary air lock to halt the feeding of material into the duct. The airflow continues until each of the required materials is discharged into the container so that each adds to the total weight until the total weight of material within the container either fills the container or reaches the total amount of micronutrients required for the mix. At this time the vacuum is halted to allow the material to fall from the filtration device into the hopper section 19 whereupon the valve is actuated to discharge the material into the container 22 for mixing.

The system of the present invention therefore provides an arrangement for readily communicating the micro nutrients or other particulate materials from the individual hoppers to a collection area for discharge into the mixing system and at the same time while being collected within the separator container, the materials are weighed so as to control the supply of materials to provide an accurate amount of materials for mixing recipe. The rotary air locks can be designed to feed the material at a relatively slow rate so that the weight of materials can be accurately controlled.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. A method for dispensing measured quantities of particulate material comprising:

providing a duct;

providing at least one hopper containing the material to be dispensed;

connecting the hopper to the duct so that material can be dispensed from the hopper to the duct;

generating an air flow through the duct to carry the material from the hopper along the duct;

controlling flow of material from the hopper to the duct through an air lock valve which prevents flow of air from the duct to the hopper;

opening the valve to supply material from the hopper to the duct in an unmeasured stream such that, until the valve is closed, the material will continue to a flow to an unmeasured weight;

providing a separator container in the duct such that the material in the duct carried by the air flow passes to the separator container;

in the separator container separating the material from the air flow to deposit the material into the container while the air flow is discharged from the container;

weighing the deposited material while the material is maintained in the separator container;

controlling the air lock valve so as to continue to discharge the material in the unmeasured stream up to a predetermined weight as determined by the weighing of the material in the separator container;

when the predetermined weight is reached, as determined by the weighing of the material in the separator container, closing the air lock valve to halt the supply of material from the hopper to the duct in the unmeasured stream;

and discharging the deposited material from the separator container.

2. The method according to claim 1 including mounting the separator container on a weighing system to effect weighing thereof with the material inside.

3. The method according to claim 2 including mounting the separator container on load cells.

4. The method according to claim 1 including providing a plurality of hoppers each containing a different material and connecting each to the duct for discharge through a respective air lock valve for separately sending a respective one of the different materials to the separator container.

5. The method according to claim 4 including separately sending a predetermined weight of each of the materials to the separator container before the materials are discharged from the separator container.

6. The method according to claim 1 including discharging the material from the separator container into a mixing container.

7. The method according to claim 6 including providing in the mixing container a bulk material into which the material from the separator container is mixed.

8. The method according to claim 1 including providing in the separator container a centrifugal separating section.

9. The method according to claim 8 including arranging the duct so as to inject air flow tangentially into the centrifugal separating section.

10. The method according to claim 9 including providing in the centrifugal separating section a central filter section through which the air is withdrawn.

11. The method according to claim 10 wherein the air is pulled by vacuum from the central filter section.

12. The method according to claim 10 the separator container on each of which includes a load cell.

13. A method of mixing a plurality of different materials in small amounts into a bulk material comprising:

providing a duct;

providing a plurality of hoppers each containing a respective one of the different materials to be mixed;

connecting each hopper to the duct so that material can be dispensed from the hopper to the duct;

generating an air flow through the duct to carry the materials from the hoppers along the duct;

controlling flow of material from each hopper to the duct through a respective air lock valve which prevents flow of air from the duct to the respective hopper and which is arranged to supply material from the hopper to the duct in an unmeasured stream to an unmeasured volume;

providing a separator container in the duct such that the material in the duct carried by the air flow passes to the separator container;

in the separator container separating the material from the air flow to deposit the material into the container while the air flow is discharged from the container;

providing a mixing container;

providing in the mixing container the bulk material into which the different material from the separator container are to be mixed;

generating in the separator container a batch of at least one of the different materials to be mixed by:

selecting a required one of the hoppers;

operating the air lock valve of the selected hopper to supply material from the hopper to the duct in the unmeasured stream;

controlling the air lock valve of the selected hopper so as to continue to discharge the material in the unmeasured stream up to a predetermined required weight as determined by the weighing of the material in the separator container;

and when the predetermined weight is reached, as determined by the weighing of the material in the separator container, operating the air lock valve to halt the supply of material from the hopper to the duct in the unmeasured stream;

and discharging the deposited material from the separator container into the mixing container for mixing with the bulk material therein.

14. The method according to claim 13 including mounting the separator container on a weighing system to effect weighing thereof with the material inside.

15. The method according to claim 13 including separately sending a predetermined weight of each of a plurality of required ones of the different materials to the separator container before the plurality of materials are discharged from the separator container.

16. The method according to claim 13 including providing in the separator container a centrifugal separating section.

17. The method according to claim 13 including arranging the duct so as to inject air flow tangentially into the centrifugal separating section.

18. The method according to claim 13 including providing in the centrifugal separating section a central filter section through which the air is withdrawn.

* * * * *